Sept. 3, 1940.  T. DOWRICK ET AL  2,213,488
WHISTLE VALVE
Filed Sept. 20, 1938
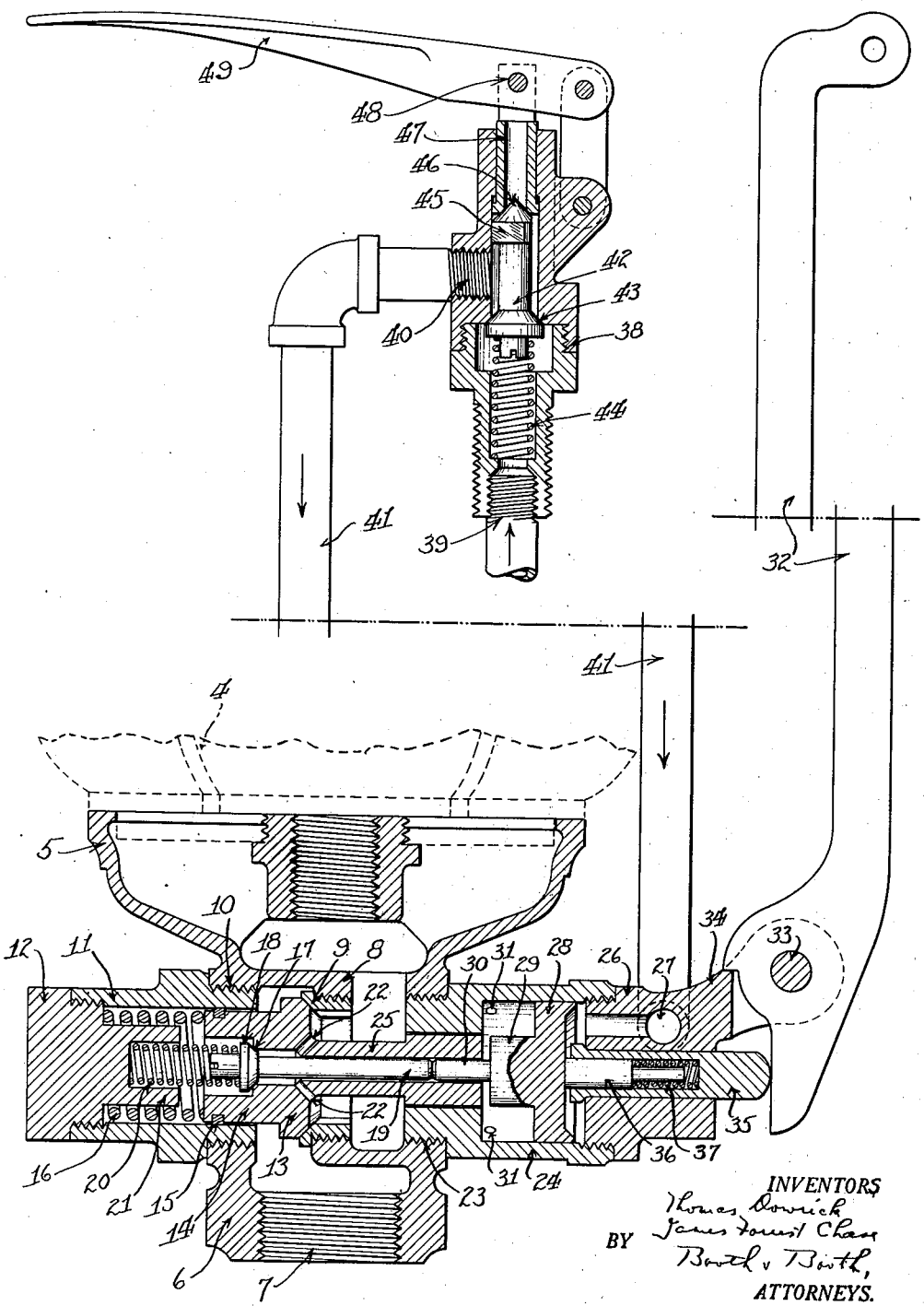
INVENTORS
Thomas Dowrick
James Forrest Chase
BY Booth v Booth,
ATTORNEYS.

Patented Sept. 3, 1940

2,213,488

UNITED STATES PATENT OFFICE 2,213,488

WHISTLE VALVE

Thomas Dowrick and James Forrest Chase, Sacramento, Calif.

Application September 20, 1938, Serial No. 230,750

4 Claims. (Cl. 277—36)

The present invention relates to a valve especially adapted for controlling and operating a whistle, such as is used on a locomotive for example.

The principal object of the invention is to provide a whistle valve operated by fluid pressure in which the amount or degree of opening can be controlled with considerable accuracy, so that the operator can regulate the tone or volume of sound produced. A second object is to provide a balanced valve in which the pressure of the control fluid is balanced against the pressure of the operating or sounding fluid. Another object is to provide means for relieving back pressure that may accumulate against the valve when closed. Still further objects and advantages of the invention will be brought out in the following description, which should be read with the understanding that changes may be made in the form, construction and arrangement of the several parts herein shown and described, without departing from the spirit of the invention as defined in the claims hereto appended.

The embodiment of the invention herein shown and described is designed for use on a steam locomotive, steam being used to operate or sound the whistle, and compressed air being used to control the whistle valve. The whistle valve is located, as usual, beneath the whistle on top of the boiler, or in some other suitable exposed position, and the control valve is located in the engineer's cab. The whistle valve is provided with an emergency lever by which it can be operated by a cord running to the cab, in the event of failure of the air supply.

Reference will be made to the accompanying drawing, in which the figure is a broken vertical section of the complete apparatus, the control valve being shown in the upper portion of the figure and the whistle valve being shown in the lower portion.

Referring more particularly to the drawing, the reference numeral 5 designates the base of a whistle, of any suitable and usual form, which is extended downwardly to form a valve body 6, and is provided at its lower end with threads 7 for connection with a steam pipe, not shown, leading from the boiler. The bell of the whistle is above the base 5, is usual, and a portion of it has been shown in dotted lines at 4.

The valve body 6 has a partition 8 formed within it, into which is screwed an annular valve seat 9. The rear wall of the body has a threaded opening 10 into which is screwed a guide cylinder 11, the rear or outer end of the latter being closed by a plug 12. A valve member 13 has a conical face cooperating with the seat 9 and a cylindrical rearward extension 14 sliding within the guide 11. A packing ring 15 is provided in said extension to minimize passage of boiler steam into said guide cylinder. A spring 16 is positioned between the rear end of the valve extension and the plug 12 to close the valve.

The valve member 13 is hollow, and has an interior seat 17 upon which is seated a relief valve 18, the latter having a stem 19 sliding in the hollow interior of the main valve 13. A spring 20 between the outer end of the relief valve 18 and the plug 12 holds said relief valve to its seat. The plug 12 has a cylindrical extension 21 which serves as a guide for both valve springs 16 and 20. The main valve member 13 has one or more relief passages or ports 22 leading from its interior to its atmospheric side. The function of the relief valve 18 and passages 22 is to relieve any steam pressure which may have leaked past the packing 15 into the guide cylinder 11.

The forward side of the valve body 6 has a threaded opening 23 into which is screwed a control cylinder 24. The stem 25 of the main valve passes through and is guided by the rear end of said control cylinder, and the outer end of said cylinder is closed by a head 26 in which is an air passage 27. A piston 28 is slidable in the cylinder 24, and has a boss 29 on its rear face adapted to abut against the end of the main valve stem 25. The piston 28 also has a pin 30 adapted to contact the end of the relief valve stem 19 before the boss 29 contacts the main valve stem 25. Vent passages 31 extend through the wall of the cylinder 24 near its rear end, to relieve any air pressure that may leak past the piston 28.

When compressed air is admitted to the passage 27, and thence to the forward end of the cylinder 24, the piston 28 is moved rearwardly. The pin 30 first contacts the relief valve stem 19 and opens the relief valve 18, thereby relieving any steam pressure that may exist within the guide cylinder 11. The boss 29 then contacts the main valve stem 25, and further movement of the piston 28 opens the main valve 13 and admits steam to the whistle. When the air pressure in the cylinder 24 is relieved, the spring 16 assisted by steam pressure on the back of the main valve, returns said main valve to its seat, and the relief valve 18 is also closed by its spring 20.

The main valve 13 is approximately balanced between air pressure on the piston 28 on one side and steam pressure and the spring 16 on the other side, so that it can be opened more or less by increasing or decreasing the amount of air supplied to the cylinder 24, thereby controlling the volume of sound of the whistle. The prior opening of the relief valve 18 prevents steam pressure in the guide cylinder 11 from interfering with the opening of the main valve, so that no more air is required to open the valve than to hold it open, thus assuring smooth and accurate control of the volume of sound.

A manual operating lever 32 is provided for emergency use, said lever being pivoted at 33 between ears 34 extending from the cylinder head 26. A push rod 35 extends through the head 26 and has its outer end in contact with the lower end of the lever 32. A pin 36 is slidably mounted in the inner end of the push rod 35, and is pressed by a spring 37 against the piston 28. Moving the lever 32 therefore pushes the piston 28 rearwardly and opens the relief and main valves as previously described.

Air can be supplied to the cylinder 24 through any suitable control valve, but we prefer to use a valve of the type shown in the upper portion of the drawing. This control valve, located in the engineer's cab, comprises a body 38 having an air inlet at 39 which may be connected with the air system of the locomotive, and an air outlet 40 connected by a pipe 41 with the air inlet 27 of the whistle valve. A valve member 42 is slidably mounted in the body 38, and is held to its seat 43 by a spring 44. The upper portion of said valve member is formed as a triangular guide 45, and its upper end 46 is conical and fits against a seat formed in the lower end of a tubular plunger 47, which has a close sliding fit in the upper end of the body. The upper end of said plunger is bifurcated and connected at 48 with a handle 49. When the handle is depressed, the plunger 47 and valve member 42 are moved downwardly, opening the valve at 43 and admitting air to the pipe 41 and thence to the whistle valve. When the handle 49 is released, the spring 44 closes the valve at 43, and the air pressure in the pipe 41 and whistle valve cylinder 24 escapes through the valve formed between the upper end 46 of the valve member and the bottom of the plunger 47. The control valve, therefore, operates as a three-way valve, depressing the handle admitting air pressure from the compressed air supply to the whistle valve cylinder, and releasing or raising said handle cutting off the air supply and venting the whistle valve cylinder to the atmosphere.

We claim:

1. A valve structure comprising a body having a fluid passage, a valve seat in said passage, a valve member cooperating with said seat, a slidable stem upon which said valve member is mounted, a cylinder aligned with said stem, a piston in said cylinder, said piston having means contacting said stem whereby movement of said piston opens the valve, a head closing the outer end of said cylinder remote from said stem, said head having a guide passage, a plunger slidable in said guide passage and engaging said piston, an operating lever engaging said plunger to move said piston and open the valve, and means for admitting fluid to the closed end of said cylinder to move said piston independently of said lever.

2. A valve structure comprising a body having a fluid passage, a valve seat in said passage, a valve member cooperating with said seat, a slidable stem upon which said valve member is mounted, a cylinder aligned with said stem, a piston in said cylinder, said piston having means contacting said stem whereby movement of said piston opens the valve, a head closing the outer end of said cylinder remote from said stem, said head having a guide passage, a plunger in said guide passage, said plunger being resiliently contractible and expansible lengthwise and having its inner end in contact with said piston, an operating lever engaging the outer end of said plunger for moving said piston to open the valve, and means for admitting fluid to the closed end of said cylinder to move said piston independently of said lever.

3. A valve assembly comprising a body member having a fluid passage provided with a valve seat, a main valve member movable into and out of engagement with said seat and having a longitudinal bore extending therethrough, said valve seat dividing said passage into an inlet portion and a discharge portion, said valve member having an extension on the inlet side of said seat and a valve stem on the discharge side thereof, the bore of the valve having a port communicating with the discharge portion of said passage, said body member having spaced inner and outer guide portions in which the valve member extension and stem are respectively slidably mounted, said outer guide portion communicating with an outer valve operating cylinder vented to atmosphere, spring means disposed within said inner guide portion engaging at one end directly against said valve extension to normally hold the valve member against its seat, a relief valve member having a stem movably mounted within the bore of said valve member and normally held by spring means in position to close said bore, a piston member movably mounted within said valve operating cylinder and having spaced portions engageable successively with the stems of said relief and main valve members respectively for opening both of said valves in timed relation to successively relieve pressure in the inlet portion of said valve body member and to open communication for said pressure to the discharge portion of said member, and means for admitting fluid under pressure to said operating cylinder to move said piston into successive operating engagement wtih said valve members.

4. A valve assembly comprising a body member having a fluid passage provided with a valve seat, a main valve member movable into and out of engagement with said seat and having a longitudinal bore extending therethrough, said valve seat dividing said passage into an inlet portion and a discharge portion, said valve member having an extension on the inlet side of said seat and a valve stem on the discharge side thereof, the bore of the valve having a port communicating with the discharge portion of said passage, said body member having spaced inner and outer guide portions in which the valve member extension and stem are respectively slidably mounted, said outer guide portion being disposed adjacent and communicating with an outer valve operating cylinder vented to atmosphere at its inner end, spring means disposed within said inner guide portion engaging at one end directly against said valve extension to normally hold the valve member against its seat, a relief valve member having a stem movably mounted within the bore of said valve member and normally held by independent spring means in position to close said bore, a piston member having free floating movement within said valve operating cylinder and having spaced portions engageable successively with the stems of said relief and main valve members respectively for opening both of said valves in timed relation to successively relieve pressure in the inlet portion of said valve body member and to open communication for said pressure to the discharge portion of said member, and means for admitting fluid under pressure to said operating cylinder exteriorly of said piston to move the latter into successive operating engagement with said valve members against the tension of their respective spring means, whereby to progressively increase from a minimum the closing reaction of said main valve member spring means in substantial proportion to the extent of opening of said main valve member and to render said valve delicately responsive to the force of said fluid pressure against said piston.

THOMAS DOWRICK.
JAMES FORREST CHASE.